(12) United States Patent
Llobet

(10) Patent No.: US 10,488,553 B2
(45) Date of Patent: Nov. 26, 2019

(54) STRESS TENSOR COMPUTATION USING MINDLIN FORMULATION

(71) Applicant: Tebis Llobet, Sugar Land, TX (US)

(72) Inventor: Tebis Llobet, Sugar Land, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 894 days.

(21) Appl. No.: 15/088,576

(22) Filed: Apr. 1, 2016

(65) Prior Publication Data

US 2017/0285220 A1    Oct. 5, 2017

(51) Int. Cl.
*G01V 99/00* (2009.01)
*G06F 17/13* (2006.01)

(52) U.S. Cl.
CPC ............ *G01V 99/005* (2013.01); *G06F 17/13* (2013.01)

(58) Field of Classification Search
CPC ............................... G01V 99/005; G06F 17/13
USPC .............................................................. 703/2
See application file for complete search history.

(56) References Cited

U.S. PATENT DOCUMENTS

| | | | | |
|---|---|---|---|---|
| 7,620,534 B2 * | 11/2009 | Pita | ........................ | G01V 1/30 700/30 |
| 8,214,152 B2 | 7/2012 | Ozan et al. | | |
| 2007/0265782 A1 * | 11/2007 | Kleinberg | .............. | G01V 1/288 702/6 |
| 2009/0065252 A1 * | 3/2009 | Moos | ........................ | E21B 7/06 175/50 |
| 2011/0061860 A1 * | 3/2011 | Dean | ....................... | E21B 43/00 166/250.01 |
| 2011/0257944 A1 * | 10/2011 | Du | ........................ | E21B 43/267 703/2 |
| 2014/0379314 A1 * | 12/2014 | Hayashi | .................. | G06F 17/13 703/2 |
| 2015/0292323 A1 * | 10/2015 | Shahri | ................... | E21B 49/006 702/9 |

OTHER PUBLICATIONS

Khalid Aziz et. al., Productivity and Injectivity of Horizontal Wells, National Petroleum Technology Office U.S. Department of Energy Tulsa, Oklahoma, Nov. 1999, 1-205. . (Year: 1999).*

(Continued)

*Primary Examiner* — Rehana Perveen
*Assistant Examiner* — Justin C Mikowski
(74) *Attorney, Agent, or Firm* — Cantor Colburn LLP

(57) ABSTRACT

A method for performing an earth formation borehole-related task includes: calculating a contribution to stress at each grid cell volume of interest in a geo-cellular model from other grid cell volumes that are at elevations above the grid cell volume of interest by use of the Mindlin Formulation using difference values between actual and linear approximation density values and Poisson's ratio values; adding all contributions to the stresses from all other grid cell volumes that are at elevations above the grid cell volume of interest to provide a stress tensor correction; adding first approximation of stress tensor components to the stress tensor correction to provide a total stress value; constructing a resulting stress tensor for the earth formation using the total stress values for the grid cell volumes of interest; and performing the borehole-related task using borehole-related equipment and the resulting stress tensor for the earth formation.

15 Claims, 6 Drawing Sheets

(56) References Cited

OTHER PUBLICATIONS

Davis, et al, "Elasticity and Geomechanics", Cambridge University Press, 1996, (pp. 102-107).
Poulos, Harry; "Calculation of Stress and Settlement in Soil Masses" (2002), John Wiley and Sons; Retrieved from the internet:, URL: http://www.knovel.com; 54 pages.
Mindlin, R. D.;"Force at a Point in the Interior of a Semi-Infinite Solid"; Physics, vol. 7, May 1936, 8 pages.
Mindlin, R.D.; "Force at a Point in the Interior of a Semi Infinite Solid"; Office of Naval Research Project NR-064-388; May 1953; 13 pages.

\* cited by examiner

US 10,488,553 B2

STRESS TENSOR COMPUTATION USING MINDLIN FORMULATION

BACKGROUND

Boreholes are drilled into earth formations for various purposes such as hydrocarbon production, geothermal production, and carbon dioxide sequestration. In general, the boreholes are drilled by rotating a drill bit disposed at the distal end of a string of drill pipes referred to as a drill string. Several drilling and engineering parameters may be selected by a drilling operator or analyst to properly drill a borehole to keep it stable and prevent it from collapsing. One example of a drilling parameter is mud weight or density of drilling fluid used to drill the borehole. The density is selected so as to provide enough weight at depth in the borehole to prevent cave-ins. One example of an engineering parameter is the location and direction of the borehole as it penetrates the earth. Selection of both drilling parameters and engineering parameters may be dependent on knowing the various stresses experienced by the formation rock to be drilled. Hence, more accurate knowledge of formation stresses would be well received in the drilling and production industries.

BRIEF SUMMARY

Disclosed is a method for performing a borehole-related task on an earth formation having changes in density. The method includes: constructing a geo-cellular model of the earth formation using a processor, the geo-cellular model comprising a plurality of grid cell volumes; populating multiple grid cell volumes with corresponding actual density values and actual Poisson's ratio values for the grid cell volumes using the processor; calculating with the processor a linear approximation of the density values and a linear approximation of the Poisson's ratio values as a function of spatial coordinates of the individual volume cells to provide linear approximation density values and linear approximation Poisson's ratio values for the plurality of grid cell volumes; calculating with the processor a first approximation of components of a stress tensor representing stress in the formation using the linear approximation of the density values and the linear approximation of the Poisson's ratio values for the plurality of grid cell volumes; calculating with the processor a difference between the actual density values and the linear approximation density values to provide density difference values for each of the grid cell volumes in the plurality of grid cell volumes; calculating with the processor a contribution to stress at each grid cell volume of interest from other grid cell volumes that are at elevations above the grid cell volume of interest by use of the Mindlin Formulation using the density difference values and the Poisson's ratio values associated with each grid cell volume in the plurality of grid cell volumes; adding with the processor all contributions to the stresses at each grid cell volume of interest from all other grid cell volumes that are at elevations above the grid cell volume of interest to provide a correction to the stress tensor; adding with the processor the first approximation of the components of the stress tensor to the correction to the stress tensor to provide a total stress value that completely defines a state of stress in each grid cell volume of interest; constructing with the processor a resulting stress tensor for the earth formation using the total stress values for the grid cell volumes of interest; and performing the borehole-related task using borehole-related equipment and the resulting stress tensor for the earth formation.

Also disclosed is a system for performing a borehole-related task on an earth formation having changes in density. The system includes a memory having computer readable instructions and a processor for executing the computer readable instructions. The computer readable instructions include: constructing a geo-cellular model of the earth formation, the geo-cellular model comprising a plurality of grid cell volumes; populating multiple grid cell volumes with corresponding actual density values and actual Poisson's ratio values for the grid cell volumes; calculating a linear approximation of the density values and a linear approximation of the Poisson's ratio values as a function of spatial coordinates of the individual volume cells to provide linear approximation density values and linear approximation Poisson's ratio values for the plurality of grid cell volumes; calculating a first approximation of components of a stress tensor representing stress in the formation using the linear approximation of the density values and the linear approximation of the Poisson's ratio values for the plurality of grid cell volumes; calculating a difference between the actual density values and the linear approximation density values to provide density difference values for each of the grid cell volumes in the plurality of grid cell volumes; calculating a contribution to stress at each grid cell volume of interest from other grid cell volumes that are at elevations above the grid cell volume of interest by use of the Mindlin Formulation using the density difference values and the Poisson's ratio values associated with each grid cell volume in the plurality of grid cell volumes; adding all contributions to the stresses at each grid cell volume of interest from all other grid cell volumes that are at elevations above the grid cell volume of interest to provide a correction to the stress tensor; adding the first approximation of the components of the stress tensor to the correction to the stress tensor to provide a total stress value that completely defines a state of stress in each grid cell volume of interest; and constructing a resulting stress tensor for the earth formation using the total stress values for the grid cell volumes of interest. The system further includes borehole-related equipment configured to perform the borehole-related task using the resulting stress tensor for the earth formation.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the figures.

Disclosed is a method for performing a borehole-related task on an earth formation having spatial variations in its relevant properties (i.e.: density and Poisson's ratio). The method includes estimating a stress tensor for the earth formation and then performing the borehole-related task, which is dependent on the stress tensor. The borehole-related tasks use the estimated formation stress tensor as an input to compute operational parameters (such as drilling mud density, for instance) that will increase the likelihood of the borehole being stable and prevent it or portions of it from collapsing. Other examples of the borehole-related task include selecting an appropriate location for drilling the borehole, and establishing a trajectory for drilling the borehole so that it intercepts the productive formation layers in the most convenient relative orientation.

Figure 1A:
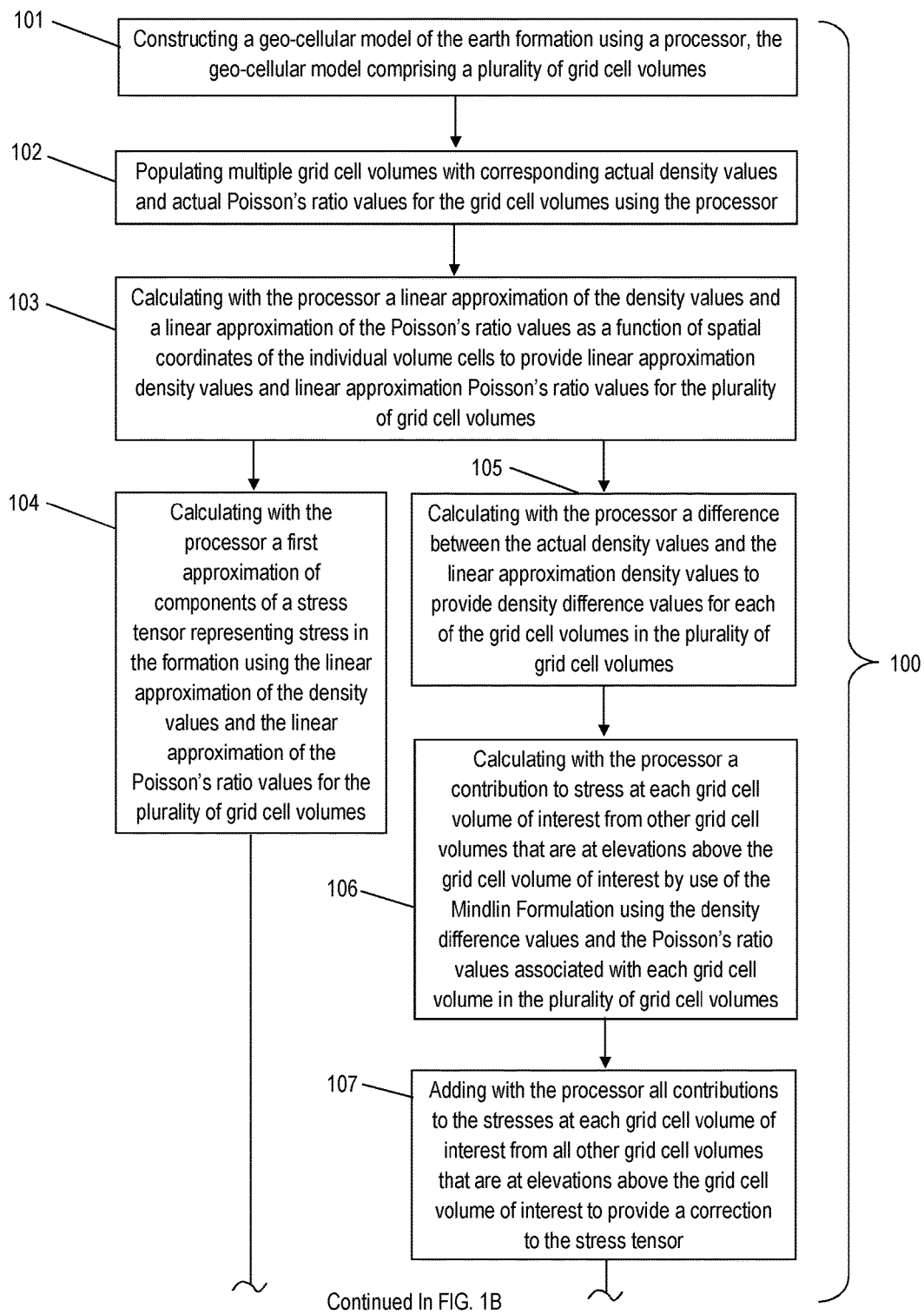
FIGS. 1A and 1B, collectively referred to as FIG. 1, present a flow chart of a method for performing a borehole-related task on an earth formation having changes in density.
Figure 1B:
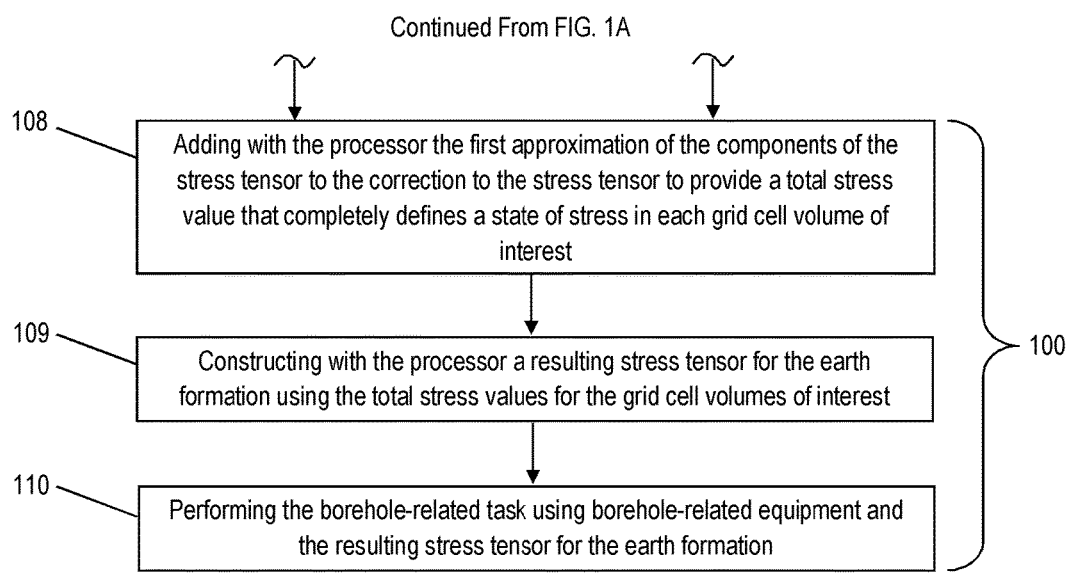
Figure 2:
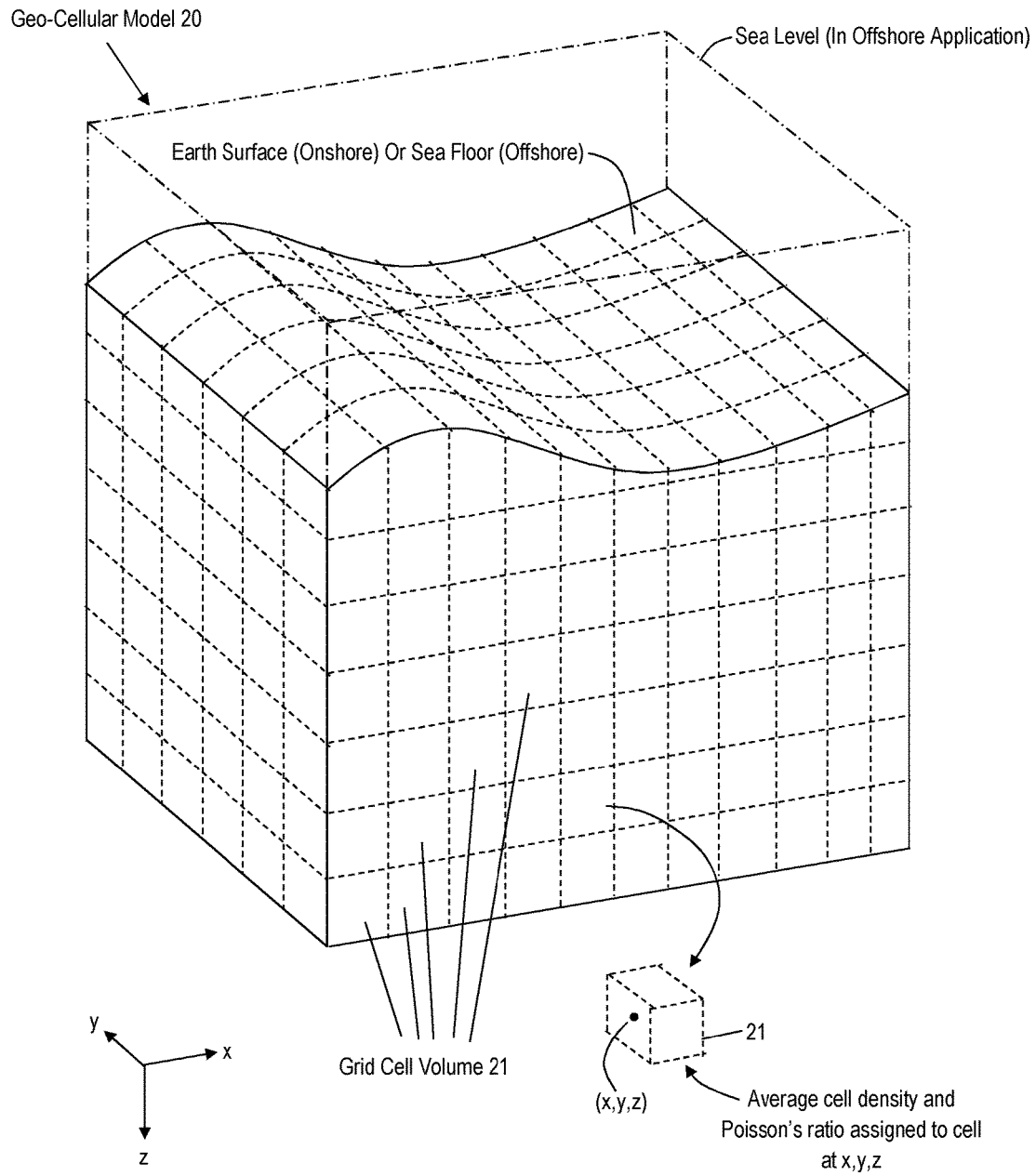
FIG. 2 depicts aspects of a geo-cellular model used for estimating a stress tensor of the earth formation.

FIG. 1 is a flow chart of a method 100 for performing a borehole-related task on an earth formation having changes in density of formation material. Block 101 calls for constructing a geo-cellular model of the earth formation using a processor, the geo-cellular model having a plurality of grid cell volumes. The geo-cellular model is a mathematical or virtual model that may be implemented by a processor such as in a computer processing system. In general, the geo-cellular model models the earth formation up to and including the surface of the earth above the earth formation. In marine environments, the geo-cellular model models the undersea earth formation up to and including the surface of the water. FIG. 2 illustrates a simplified version of a geo-cellular model 20 for teaching purposes. The geo-cellular model 20 is divided into a plurality of grid cell volumes 21. The plurality of grid cell volumes 21 may have the same dimensions or different dimensions. In one or more embodiments, at least one grid cell volume in the plurality has dimensions that are different from the dimensions of other grid cell volumes in the plurality. In one example, a grid cell volume may have dimensions of 200 meters (m) by 200 m in a lateral (x, y) plane and a thickness of 25 m in a vertical (z) direction, while another grid cell volume may have different dimensions. Also, there is no requirement that any of the external faces of any of the grid cell volumes should be planar and/or oriented along any of the x, y or z directions. Each grid cell volume may be identified by a coordinate (e.g., x, y, z) of a point in the grid volume such as in the center of the grid volume for example, but for the computations being executed, it is convenient to use the coordinates of the cell's center of mass. While the geo-cellular model 20 in FIG. 2 is illustrated with boundaries having straight lines, the boundary lines in other embodiments may not be straight but curved.

Block 102 in FIG. 1 calls for populating multiple grid cell volumes with corresponding actual density values ($\rho$) and actual Poisson's Ratio values ($\nu$) for the grid cell volumes using the processor. This data may be obtained from various sources. Non-limiting embodiments of the sources include seismic surveys of the earth formation, logs of existing nearby wells, elevation maps, and marine charts. Data from logs of existing nearby wells penetrating the earth formation of interest may be extrapolated to locations of grid cell volumes in the geo-cellular model. Elevation maps include the elevation of points at the surface of the earth above the earth formation being modeled by the geo-cellular model. Marine charts include the offshore depths from mean sea level to the sea floor.

Figure 3:
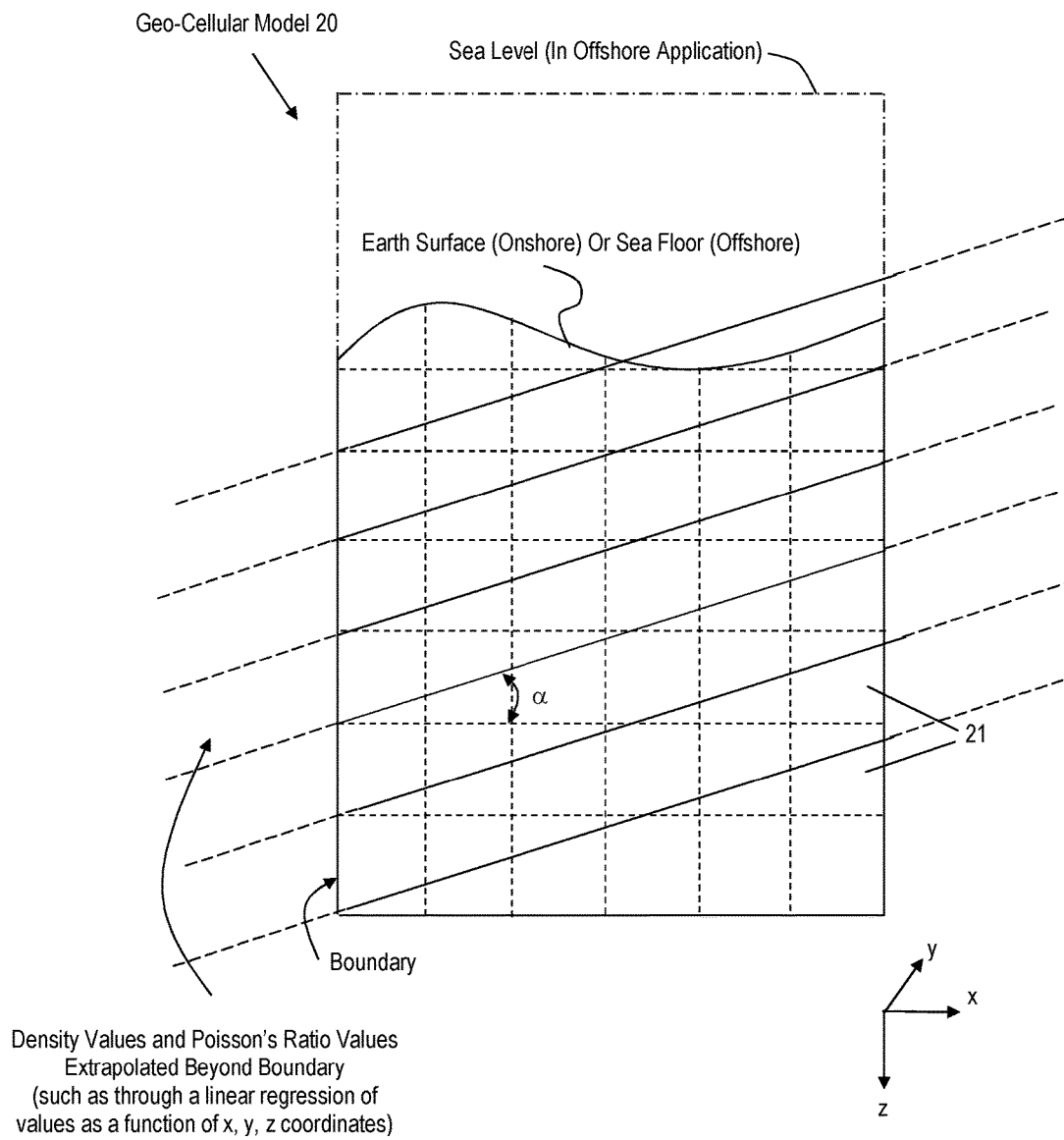
FIG. 3 depicts aspects of a tilted-layer geo-cellular model.

Block 103 in FIG. 1 calls for calculating with the processor a linear approximation of the density values and of the Poisson's ratio values as a function of spatial coordinates of the individual volume cells to provide linear approximation density values and linear approximation Poisson's ratio values for the plurality of grid cell volumes. The result of this calculation is equivalent to a layer-cake formation, composed of layers of constant density and constant Poisson's Ratio, inclined by an angle $\alpha$ in relation to the horizontal plane, dipping towards a direction identified by the angle $\beta$ measured clockwise from the "y" (North) direction in what is being termed a tilted-layer-cake approximation, as shown in FIG. 3. In one or more embodiments, the spatial coordinates are x, y, z coordinates.

Block 104 in FIG. 1 calls for calculating with the processor a first approximation of components of a stress tensor representing stress in the formation using the linear approximation of the density values and the linear approximation of the Poisson's ratio values for the plurality of grid cell volumes. The approximations may be calculated using analytical methods known in the art. In one or more embodiments, the first approximation of the stress tensor includes six components that completely describe the stress field in the formation. For example, one of ordinary skill in the art would know and understand the following stress components—$\sigma^*_x$, $\sigma^*_y$, $\sigma^*_z \tau^*_{yz} \tau^*_{zx}$, and $\tau^*_{xy}$ (with the asterisk indicating the stress components are first approximations)— for describing stress or stress field in a three-dimensional volume. Several textbooks describe how to compute these components (e.g.: R. O. Davis and A. P. S. Selvadurai, "Elasticity and Geomechanics", Cambridge University Press, 1996, pages 102-107), so it is not discussed in further detail herein beyond listing the reference equations used:

$\sigma^*_z = \rho g z \cos \alpha;$ $\sigma^*_x = \sigma^*_y = \nu \sigma^*_z / (1-\nu);$ $\tau^*_{xz} = \rho g z \sin \alpha \cos \beta;$ $\tau^*_{yz} = \rho g z \sin \alpha \sin \beta;$ and $\tau^*_{xy} = 0.$ Block 105 in FIG. 1 calls for calculating with the processor a difference between the actual density values and the linear approximation density values to provide density difference values for each of the grid cell volumes in the plurality of grid cell volumes.

Figure 5:
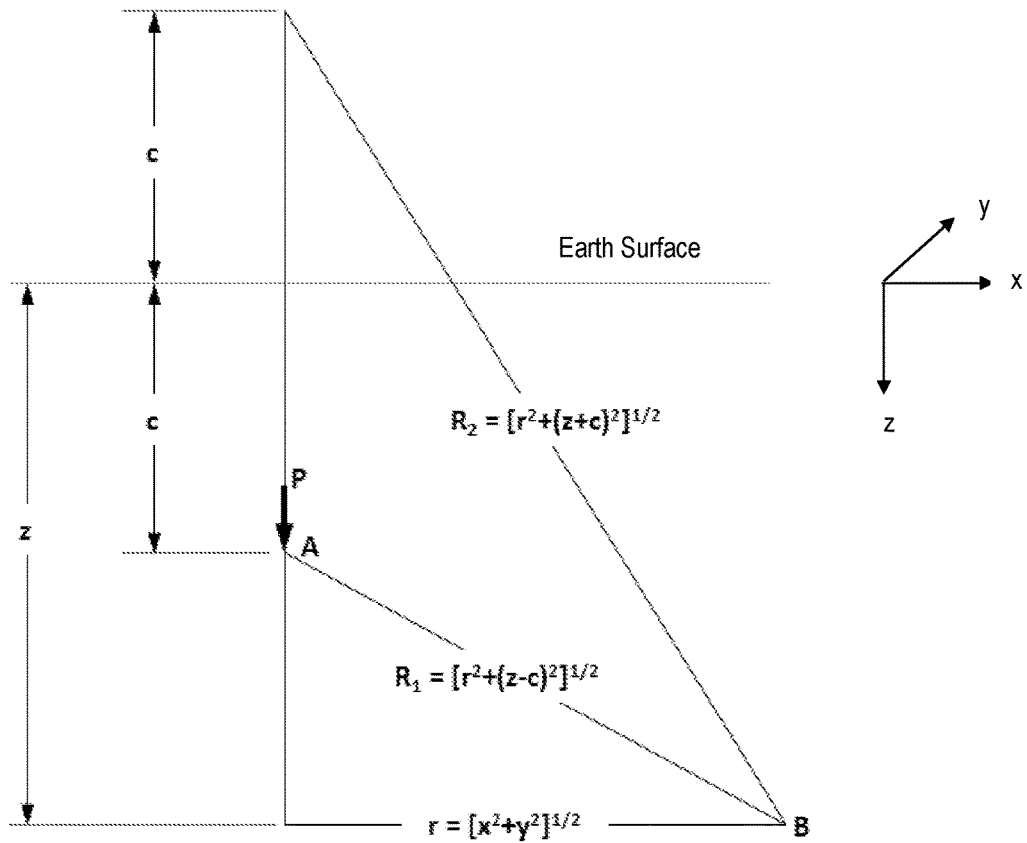
FIG. 5 depicts aspects of parameters used in the Mindlin Formulation.

Block 106 in FIG. 1 calls for calculating with the processor a contribution to stress at each grid cell volume of interest from other grid cell volumes that are at elevations above the grid cell volume of interest by use of the Mindlin Formulation using the density difference values and the Poisson's ratio values associated with each grid cell volume. The Mindlin Formulation refers to the calculations developed by R. D. Mindlin in "Force at a Point in the Interior of a Semi-Infinite Solid", in Physics, vol. 7, May 1936, pages 195-202, later expanded in the same author's document "Office of Naval Research Project NR-064-388", dated May 1953. Offset grid cell volumes that are at elevations above the grid cell volume of interest are those grid cell volumes that contribute to the overburden stress in the grid cell volume of interest. Offset grid cell volumes that are lower (i.e., beneath) in elevation than the grid cell volume of interest or lateral to the grid cell volume of interest do not affect the stress in the grid cell volume of interest. The Mindlin Formulation includes mathematical equations that enable the estimation, in one point of a semi-infinite elastic body, of the change in the stress tensor due to the application of a force in another point within that same elastic body. For example, the Mindlin Formulation may be used to calculate the effect due to a vertical force "P" applied to a point "A"

at a depth "c" below the surface within a semi-infinite body on the stress field at another point "B" within the same body at a depth deeper than "c" as discussed by Harry G. Poulos (2002) in "Calculation of stress and settlement in soil masses", published as Chapter 1.6 (pp. 274-276) of *Geotechnical Engineering Handbook* (Volume 1, Fundamentals) Smoltczyk, Ultrich (Editor) ISBN: 978-3433014493. The location of "B" is represented by coordinates x, y, z with z being the depth of point "B" below the surface. Using the difference between the actual density of a grid cell and the approximated density used for the linear approximation, the calculated stress field includes $\Delta\sigma_x$, $\Delta\sigma_y$, $\Delta\sigma_z$, $\Delta\tau_{yz}$, $\Delta\tau_{zx}$, and $\Delta\tau_{xy}$ (with the $\Delta$ symbol indicating the fact that they are corrections to the first approximations). In that one of ordinary skill in the art would understand the Mindlin Formulation and how the formulation and equations are applied, it is not discussed in further detail herein beyond presenting the following reference equations used with respect to FIG. 5:

$$\sigma_x = \frac{-P}{8\pi(1-v)}\left[\frac{(1-2v)(z-c)}{R_1^3} - \frac{3x^2(z-c)}{R_1^5} + \right.$$
$$\frac{(1-2v)[3(z-c)-4v(z+c)]}{R_2^3} -$$
$$\frac{3(3-4v)x^2(z-c) - 6c(z+c)[(1-2v)z-2vc]}{R_2^5} - \frac{30cx^2z(z+c)}{R_2^7} -$$
$$\left.\frac{4(1-v)(1-2v)}{R_2(R_2+z+c)}*\left(1 - \frac{x^2}{R_2(R_2+z+c)} - \frac{x^2}{R_2^2}\right)\right]$$

$$\sigma_y = \frac{-P}{8\pi(1-v)}\left[\frac{(1-2v)(z-c)}{R_1^3} - \frac{3y^2(z-c)}{R_1^5} + \right.$$
$$\frac{(1-2v)[3(z-c)-4v(z+c)]}{R_2^3} -$$
$$\frac{3(3-4v)y^2(z-c) - 6c(z+c)[(1-2v)z-2vc]}{R_2^5} - \frac{30cy^2z(z+c)}{R_2^7} -$$
$$\left.\frac{4(1-v)(1-2v)}{R_2(R_2+z+c)}*\left(1 - \frac{y^2}{R_2(R_2+z+c)} - \frac{y^2}{R_2^2}\right)\right]$$

$$\sigma_z = \frac{-P}{8\pi(1-v)}\left[-\frac{(1-2v)(z-c)}{R_1^3} + \frac{(1-2v)(z-c)}{R_2^3} - \frac{3(z-c)^a}{R_1^5} - \right.$$
$$\left.\frac{3(3-4v)z(z+c)^2 - 3c(z+c)(5z-c)}{R_2^5} - \frac{30cz(z+c)^3}{R_2^7}\right]$$

$$\tau_{xy} = \frac{-Pxy}{8\pi(1-v)}\left[-\frac{3(z-c)}{R_1^5} - \frac{3(3-4v)(z-c)}{R_2^5} + \right.$$
$$\left.\frac{4(1-v)(1-2v)}{R_2^2(R_2+z+c)}*\left(\frac{1}{R_2+z+c} + \frac{1}{R_2}\right) - \frac{30cz(z+c)}{R_2^7}\right]$$

$$\tau_{yz} = \frac{-Py}{8\pi(1-v)}\left[\frac{1-2v}{R_1^3} + \frac{1-2v}{R_2^3} - \frac{3(z-c)^2}{R_1^5} - \right.$$
$$\left.\frac{3(3-4v)z(z+c) - 3c(3z+c)}{R_2^5} - \frac{30cz(z+c)^2}{R_2^7}\right]$$

$$\tau_{zx} = \frac{-Px}{8\pi(1-v)}\left[\frac{1-2v}{R_1^3} + \frac{1-2v}{R_2^3} - \frac{3(z-c)^2}{R_1^5} - \right.$$
$$\left.\frac{3(3-4v)z(z+c) - 3c(3z+c)}{R_2^5} - \frac{30cz(z+c)^2}{R_2^7}\right]$$

Block 107 in FIG. 1 calls for adding with the processor all contributions to the stresses at each grid cell volume of interest from all other grid cell volumes that are at elevations above the grid cell volume of interest to provide a correction to the stress tensor.

Block 108 in FIG. 1 calls for adding with the processor the first approximation of the components of the stress tensor to the correction to the stress tensor to provide a total stress value that completely defines a state of stress in each grid cell volume of interest. For example, the total stress in the z direction would be computed as $\sigma_z = \sigma^*_z + \Delta\sigma_z$, and the other five components of the stress tensor can be computed analogously.

Block 109 in FIG. 1 calls for constructing a resulting stress tensor for the earth formation using the total stress values for the grid cell volumes of interest. It can be appreciated that the resulting stress tensor defines the complete state of stress experienced in each of the grid cell volumes. In one or more embodiments, the resulting stress tensor is a nine by nine matrix in which the values are a function of the location of the grid cell volume for that stress tensor.

Block 110 in FIG. 1 calls for performing the borehole-related task using borehole-related equipment and the resulting stress tensor for the earth formation. As noted above, the borehole-related task uses the formation stress tensor to, for example, enable the task to increase the likelihood of the borehole being stable or decrease the likelihood of the borehole or portions of the borehole collapsing. In one or more embodiments, the borehole-related task is selecting an appropriate drilling mud density to ensure that the mud weight at depth is greater than the formation pore pressure. This is to prevent an uncontrolled release of formation fluid into the borehole and to the surface. In one or more embodiments, the borehole-related task is selecting an appropriate location for drilling the borehole and/or selecting a direction for drilling the borehole using borehole drilling equipment. Boreholes may be used to inject steam into a formation using steam injection equipment in order to heat formation fluid for extraction purposes. The heat may also affect the stress at the borehole wall and thus the stability of the borehole. By knowing the stress tensor of the formation to be drilled, one of ordinary skill in the art would be able to select an appropriate location and lateral direction of the path of the borehole to ensure the borehole will be stable when heated. Other borehole-related actions may also be performed with knowledge of the formation stress tensor.

It can be appreciated that the greater the number of grid cell volumes in the plurality of grid cell volumes, the greater the accuracy of computed values may be and the greater the time will be to perform the computations. Hence, a balance between the number of grid cell volumes in the plurality of grid cell volumes and the associated computational time may be determined to achieve a desired accuracy. Accordingly, computations may be performed in real time using logged data to update values associated with the grid cell volumes.

In order to increase the accuracy of the computation at grid cell volumes close to the external boundaries of the geo-cellular model, density values and Poisson's ratio values known at grid cell volumes within its boundaries may be extrapolated to a pseudo-volume outside such boundaries. By using a linear regression of said value (say, density of the cells within the geo-cellular model) as a linear function of the x, y and z coordinates of the same cells, one obtains a "tilted-layer-cake" approximation of the property against the spatial coordinates. FIG. 3 illustrates a cross-sectional view of the geo-cellular model 20 having a layer 30 tilted from a horizontal plane by an angle α. The process is equivalent to having that tilted layer 30 extrapolated to the left and to the right of the geo cellular model, as illustrated in FIG. 3, in order to approximate the probable formation density values and Poisson's ratio values to the left and to the right of the geo-cellular model. Similar extrapolations are implied beyond the other boundaries of the geo-cellular model. In one or more embodiments, the extrapolations are performed using the linear equations for density values and Poisson's ratio values. For the sake of simplicity, FIG. 3 reflects a two-dimensional graphical representation of the problem at hand, while the proposed procedure is established over a three-dimensional environment, without any restriction in functionality. In that one of ordinary skill in the art would understand the generality of the process being described upon reading this disclosure, it is not discussed in further detail herein.

Having the density approximated by that linear regression, as described in the preceding paragraph, allows for a quick initial pass where an approximate estimate of the stress tensor components are analytically computed. Next, using as input the difference between the actual density at a cell and its corresponding regression value obtained via the linear regression, a correction is applied, using the Mindlin Formulation.

Figure 4:
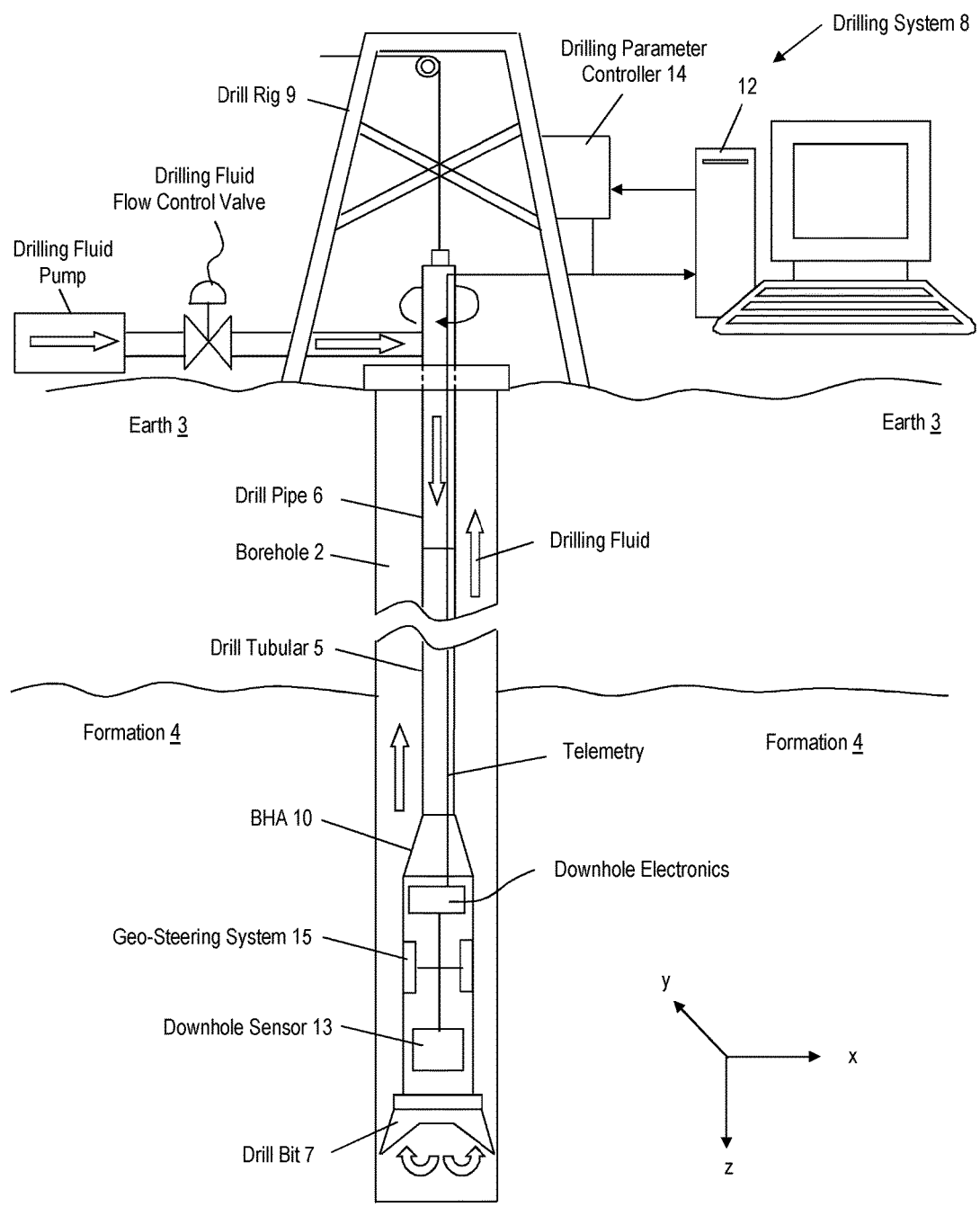
FIG. 4 illustrates a cross-sectional view of an embodiment of a drilling system for drilling a borehole penetrating the earth.

Apparatus for implementing the disclosure is now presented. FIG. 4. FIG. 4 illustrates a cross-sectional view of a drilling system 8 configured to drill a borehole 2 in the earth 3, which includes an earth formation 4. The drilling system 8 includes a drill tubular 5, which may be formed from a string of coupled drill pipes 6, and a drill bit 7 disposed at the distal end of the drill tubular 5. The drill bit 7 is configured to be rotated by the drill tubular 5 to drill the borehole 2. A bottomhole assembly (BHA) 10 may include the drill bit 7 as illustrated in FIG. 1 or it may be separate from the BHA 10. A drill rig 9 is configured to conduct drilling operations such as rotating the drill string 6 and thus the drill bit 7 in order to drill the borehole 2. In addition, the drill rig 8 is configured to pump drilling fluid (also referred to as drilling mud) through the drill string 6 in order to lubricate the drill bit 7 and flush cuttings from the borehole 2. The drill rig 9 may include a drilling fluid pump and drilling fluid flow control valve to control the flowrate of the drilling fluid. A mud motor (not shown) configured to provide further rotational energy to the drill bit 7 may also be included in the BHA 10. A geo-steering system 15 responsive to a control signal from a drilling parameter controller 14 via telemetry is configured to steer the drill bit 7 in a selected direction. A computer processing system 12 may provide the selected direction to the drilling parameter controller 14 after processing the geo-cellular model data to construct the stress tensor for the formation. The computer processing system 12 is configured to select a borehole path and thus a direction of the path by ensuring that the stress on the formation due to the borehole along the path does not exceed the strength of the formation material. The computer processing system 12 may also be configured to consider and process other stress-inducing factors such as the borehole conveying steam to heat formation fluids.

The BHA 10 may also include one or more downhole sensors 13. The downhole sensor 13 is configured to sense a formation or borehole property while drilling is being conducted or during temporary halt in drilling. Non-limiting embodiments of properties being sensed include caliper of borehole, temperature, pressure, gamma-rays, neutrons, formation density, formation porosity, formation hardness, resistivity, dielectric constant, chemical element content, and acoustic resistivity. Sensed data may be transmitted to the surface in real time via telemetry to the computer processing system 12, which may process the sensed data to update the density values and the Poisson's ratio values used in the geo-cellular model. In one or more embodiments, the density values and the Poisson's ratio values may be determined by comparing and/or extrapolating the sensed data to reference data for the property being sensed. The reference data may be obtained by testing the sensor in various samples of formation material expected to be drilled. Downhole electronics may be included in the BHA 10 to process measurements obtained from the one or more downhole sensors 13 and provide an interface for the telemetry to transmit data to the processing system 12 and receive command signals from the drilling parameter controller 14 for use by the geo-steering system 15.

Set forth below are some embodiments of the foregoing disclosure:

Embodiment 1: A method for performing a borehole-related task on an earth formation having changes in density, the method comprising: constructing a geo-cellular model of the earth formation using a processor, the geo-cellular model comprising a plurality of grid cell volumes; populating multiple grid cell volumes with corresponding actual density values and actual Poisson's ratio values for the grid cell volumes using the processor; calculating with the processor a linear approximation of the density values and a linear approximation of the Poisson's ratio values as a function of spatial coordinates of the individual volume cells to provide linear approximation density values and linear approximation Poisson's ratio values for the plurality of grid cell volumes; calculating with the processor a first approximation of components of a stress tensor representing stress in the formation using the linear approximation of the density values and the linear approximation of the Poisson's ratio values for the plurality of grid cell volumes; calculating with the processor a difference between the actual density values and the linear approximation density values to provide density difference values for each of the grid cell volumes in the plurality of grid cell volumes; calculating with the processor a contribution to stress at each grid cell volume of interest from other grid cell volumes that are at elevations above the grid cell volume of interest by use of the Mindlin Formulation using the density difference values and the Poisson's ratio values associated with each grid cell volume in the plurality of grid cell volumes; adding with the processor all contributions to the stresses at each grid cell volume of interest from all other grid cell volumes that are at elevations above the grid cell volume of interest to provide a correction to the stress tensor; adding with the processor the first approximation of the components of the stress tensor to the correction to the stress tensor to provide a total stress value that completely defines a state of stress in each grid cell volume of interest; constructing with the processor a resulting stress tensor for the earth formation using the total stress values for the grid cell volumes of interest; and performing the borehole-related task using borehole-related equipment and the resulting stress tensor for the earth formation.

Embodiment 2: The method according to claim 1, wherein each grid cell in the plurality of grid cell volumes is processed by the processor as a grid cell volume of interest.

Embodiment 3: The method according to claim 1, wherein at least one grid cell volume in the plurality has dimensions that are different from the dimensions of other grid cell volumes in the plurality.

Embodiment 4: The method according to claim 1, wherein at least one grid cell volume in the plurality has a boundary line that is curved.

Embodiment 5: The method according to claim 1, wherein the earth formation is below a body of water.

Embodiment 6: The method according to claim 1, wherein the task comprises drilling a borehole into the earth formation at a selected location based on the stress tensor.

Embodiment 7: The method according to claim 6, wherein drilling a borehole further comprises drilling the borehole in a selected lateral direction.

Embodiment 8: The method according to claim 6, further comprising drilling the borehole using a selected drilling fluid density based on the stress tensor.

Embodiment 9: The method according to claim 1, further comprising: performing a linear regression on the actual density values in grid cell volumes in a vertical column having the same lateral coordinates (x,y) to provide a linear equation relating density values to vertical depth (z); and performing a linear regression on the actual Poisson's ratio values in grid cell volumes in the vertical column having the same lateral coordinates (x,y) to provide a linear equation relating Poisson's ration values to vertical depth (z); wherein calculating a linear approximation of the density values and a linear approximation of the Poisson's ratio values comprises using (i) the linear equation relating density values to vertical depth and (ii) the linear equation relating Poisson's ratio values to vertical depth.

Embodiment 10: The method according to claim 9, wherein the geo-cellular model comprises a layer tilted from a horizontal plane having a density value that contrasts with a density value of the earth formation above and below the tilted layer.

Embodiment 11: The method according to claim 1, wherein the spatial coordinates are x, y, z coordinates at a center of mass of each grid cell volume.

Embodiment 12: A system for performing a borehole-related task on an earth formation having changes in density, the system comprising: a memory having computer readable instructions; a processor for executing the computer readable instructions, the computer readable instructions comprising: constructing a geo-cellular model of the earth formation, the geo-cellular model comprising a plurality of grid cell volumes; populating multiple grid cell volumes with corresponding actual density values and actual Poisson's ratio values for the grid cell volumes; calculating a linear approximation of the density values and a linear approximation of the Poisson's ratio values as a function of spatial coordinates of the individual volume cells to provide linear approximation density values and linear approximation Poisson's ratio values for the plurality of grid cell volumes; calculating a first approximation of components of a stress tensor representing stress in the formation using the linear approximation of the density values and the linear approximation of the Poisson's ratio values for the plurality of grid cell volumes; calculating a difference between the actual density values and the linear approximation density values to provide density difference values for each of the grid cell volumes in the plurality of grid cell volumes; calculating a contribution to stress at each grid cell volume of interest from other grid cell volumes that are at elevations above the grid cell volume of interest by use of the Mindlin Formulation using the density difference values and the Poisson's ratio values associated with each grid cell volume in the plurality of grid cell volumes; adding all contributions to the stresses at each grid cell volume of interest from all other grid cell volumes that are at elevations above the grid cell volume of interest to provide a correction to the stress tensor; adding the first approximation of the components of the stress tensor to the correction to the stress tensor to provide a total stress value that completely defines a state of stress in each grid cell volume of interest; constructing a resulting stress tensor for the earth formation using the total stress values for the grid cell volumes of interest; borehole-related equipment configured to perform the borehole-related task using the resulting stress tensor for the earth formation.

Embodiment 13: The system according to claim 12, wherein the computer readable instructions further comprise: performing a linear regression on the actual density values in grid cell volumes in a vertical column having the same lateral coordinates (x,y) to provide a linear equation relating density values to vertical depth (z); and performing a linear regression on the actual Poisson's ratio values in grid cell volumes in the vertical column having the same lateral coordinates (x,y) to provide a linear equation relating Poisson's ration values to vertical depth (z); wherein calculating a linear approximation of the density values and a linear approximation of the Poisson's ratio values comprises using (i) the linear equation relating density values to vertical depth and (ii) the linear equation relating Poisson's ratio values to vertical depth.

Embodiment 14: The system according to claim 12, wherein the borehole-related equipment comprises a drill rig and the borehole-related task comprises drilling a borehole into the earth formation at a selected location based on the stress tensor.

Embodiment 15: The system according to claim 14, wherein drilling a borehole comprises drilling the borehole in a lateral direction according to a selected geometry.

In support of the teachings herein, various analysis components may be used, including a digital and/or an analog system. For example, the geo-steering system 9, the drilling parameter controller 11, the computer processing system 12 and/or the downhole sensor 13 may include digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The term "coupled" relates to a first component being coupled to a second component either directly or indirectly via an intermediary component.

While one or more embodiments have been shown and described, modifications and substitutions may be made thereto without departing from the spirit and scope of the invention. Accordingly, it is to be understood that the present invention has been described by way of illustrations and not limitation.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for performing a borehole-related task on an earth formation having changes in density, the method comprising:
   constructing a geo-cellular model of the earth formation using a processor, the geo-cellular model comprising a plurality of grid cell volumes;
   populating multiple grid cell volumes with corresponding actual density values and actual Poisson's ratio values for the grid cell volumes using the processor;
   calculating with the processor, based on the actual density values and the actual Poisson's ratio values, a linear approximation of the density values and a linear approximation of the Poisson's ratio values as a function of spatial coordinates of the individual volume cells to provide linear approximation density values and linear approximation Poisson's ratio values for the plurality of grid cell volumes;
   calculating with the processor a first approximation of components of a stress tensor representing stress in the formation using the linear approximation of the density values and the linear approximation of the Poisson's ratio values for the plurality of grid cell volumes;
   calculating with the processor a difference between the actual density values and the linear approximation density values to provide density difference values for each of the grid cell volumes in the plurality of grid cell volumes;
   calculating with the processor a contribution to stress at each grid cell volume of interest from other grid cell volumes that are at elevations above the grid cell volume of interest by use of the Mindlin Formulation using the density difference values and the Poisson's ratio values associated with each grid cell volume in the plurality of grid cell volumes;
   adding with the processor all contributions to the stresses at each grid cell volume of interest from all other grid cell volumes that are at elevations above the grid cell volume of interest to provide a correction to the stress tensor;
   adding with the processor the first approximation of the components of the stress tensor to the correction to the stress tensor to provide a total stress value that completely defines a state of stress in each grid cell volume of interest;
   constructing with the processor a resulting stress tensor for the earth formation using the total stress values for the grid cell volumes of interest;
   performing the borehole-related task using borehole-related equipment and the resulting stress tensor for the earth formation; and
   wherein the borehole-related task comprises drilling a borehole into the earth formation at a selected location based on the stress tensor.

2. The method according to claim 1, wherein each grid cell in the plurality of grid cell volumes is processed by the processor as a grid cell volume of interest.

3. The method according to claim 1, wherein at least one grid cell volume in the plurality has dimensions that are different from the dimensions of other grid cell volumes in the plurality.

4. The method according to claim 1, wherein at least one grid cell volume in the plurality has a boundary line that is curved.

5. The method according to claim 1, wherein the earth formation is below a body of water.

6. The method according to claim 1, wherein drilling a borehole further comprises drilling the borehole in a selected lateral direction.

7. The method according to claim 1, further comprising drilling the borehole using a selected drilling fluid density based on the stress tensor.

8. The method according to claim 1, further comprising:
   performing a linear regression on the actual density values in grid cell volumes in a vertical column having the same lateral coordinates (x,y) to provide a linear equation relating density values to vertical depth (z); and
   performing a linear regression on the actual Poisson's ratio values in grid cell volumes in the vertical column having the same lateral coordinates (x,y) to provide a linear equation relating Poisson's ration values to vertical depth (z);
   wherein calculating a linear approximation of the density values and a linear approximation of the Poisson's ratio values comprises using (i) the linear equation relating density values to vertical depth and (ii) the linear equation relating Poisson's ratio values to vertical depth.

9. The method according to claim 8, wherein the geo-cellular model comprises a layer tilted from a horizontal plane having a density value that contrasts with a density value of the earth formation above and below the tilted layer.

10. The method according to claim 1, wherein the spatial coordinates are x, y, z coordinates at a center of mass of each grid cell volume.

11. The method according to claim 1, wherein calculating with the processor a linear approximation of the density values and a linear approximation of the Poisson's ratio values as a function of spatial coordinates of the individual volume cells comprises using a linear regression based on the actual density values and the actual Poisson's ratio values.

12. A system for performing a borehole-related task on an earth formation having changes in density, the system comprising:
   a memory having computer readable instructions;
   a processor for executing the computer readable instructions, the computer readable instructions comprising:
   constructing a geo-cellular model of the earth formation, the geo-cellular model comprising a plurality of grid cell volumes;

populating multiple grid cell volumes with corresponding actual density values and actual Poisson's ratio values for the grid cell volumes;

calculating, based on the actual density values and the actual Poisson's ratio values, a linear approximation of the density values and a linear approximation of the Poisson's ratio values as a function of spatial coordinates of the individual volume cells to provide linear approximation density values and linear approximation Poisson's ratio values for the plurality of grid cell volumes;

calculating a first approximation of components of a stress tensor representing stress in the formation using the linear approximation of the density values and the linear approximation of the Poisson's ratio values for the plurality of grid cell volumes;

calculating a difference between the actual density values and the linear approximation density values to provide density difference values for each of the grid cell volumes in the plurality of grid cell volumes;

calculating a contribution to stress at each grid cell volume of interest from other grid cell volumes that are at elevations above the grid cell volume of interest by use of the Mindlin Formulation using the density difference values and the Poisson's ratio values associated with each grid cell volume in the plurality of grid cell volumes;

adding all contributions to the stresses at each grid cell volume of interest from all other grid cell volumes that are at elevations above the grid cell volume of interest to provide a correction to the stress tensor;

adding the first approximation of the components of the stress tensor to the correction to the stress tensor to provide a total stress value that completely defines a state of stress in each grid cell volume of interest;

constructing a resulting stress tensor for the earth formation using the total stress values for the grid cell volumes of interest;

borehole-related equipment configured to perform the borehole-related task using the resulting stress tensor for the earth formation; and wherein the borehole-related equipment comprises a drill rig and the borehole-related task comprises drilling a borehole into the earth formation at a selected location based on the stress tensor.

13. The system according to claim 12, wherein the computer readable instructions further comprise:

performing a linear regression on the actual density values in grid cell volumes in a vertical column having the same lateral coordinates (x,y) to provide a linear equation relating density values to vertical depth (z); and performing a linear regression on the actual Poisson's ratio values in grid cell volumes in the vertical column having the same lateral coordinates (x,y) to provide a linear equation relating Poisson's ration values to vertical depth (z);

wherein calculating a linear approximation of the density values and a linear approximation of the Poisson's ratio values comprises using (i) the linear equation relating density values to vertical depth and (ii) the linear equation relating Poisson's ratio values to vertical depth.

14. The system according to claim 12, wherein drilling a borehole comprises drilling the borehole in a lateral direction according to a selected geometry.

15. The method according to claim 11, wherein the linear approximation of the density values and the linear approximation of the Poisson's ratio values as a function of spatial coordinates of the individual volume cells results in a mathematical representation of the earth formation having multiple layers inclined by a first angle in relation to a horizontal plane and dipping towards a direction identified by a second angle, each layer in the mathematical representation a constant density value and constant Poisson's ratio value.

* * * * *